United States Patent [19]

Yamamoto et al.

[11] Patent Number: 4,810,593
[45] Date of Patent: Mar. 7, 1989

[54] HIGH-STRENGTH CONDUCTORS AND PROCESS FOR MANUFACTURING SAME

[75] Inventors: Susumu Yamamoto, Itami; Akinori Mori, Kanuma, both of Japan

[73] Assignee: Sumitomo Electric Industries, Ltd., Osaka, Japan

[21] Appl. No.: 166,309

[22] Filed: Mar. 10, 1988

Related U.S. Application Data

[63] Continuation-in-part of Ser. No. 917,499, Oct. 10, 1986 abandoned.

[30] Foreign Application Priority Data

Oct. 11, 1985 [JP] Japan .................... 60-227272

[51] Int. Cl.⁴ .................... B32B 15/02; C21D 9/52
[52] U.S. Cl. .................... 428/677; 148/12 E; 148/12 B
[58] Field of Search .............. 428/614, 653, 677, 607, 428/685; 148/12 B, 11.5 Q, 326, 12 E; 174/126 CP

[56] References Cited

U.S. PATENT DOCUMENTS

| | | | |
|---|---|---|---|
| 2,422,903 | 6/1947 | Huston | 204/34 |
| 3,224,087 | 12/1965 | Nickola et al. | 29/527.4 |
| 3,251,660 | 5/1966 | Finsterwalder | 428/677 |
| 3,404,969 | 10/1968 | Holmes | 428/653 |
| 3,564,585 | 2/1971 | Camp | 428/653 |
| 3,580,706 | 5/1971 | Frieling, Jr. | 428/677 |
| 3,884,731 | 5/1975 | Barkman | 148/127 |
| 4,042,423 | 8/1977 | Van den Sype et al. | 148/12 B |
| 4,360,390 | 11/1982 | Tominaga et al. | 148/12 B |
| 4,525,598 | 6/1985 | Tsakamoto et al. | 428/653 |
| 4,745,002 | 5/1988 | Vexler | 427/652 |

FOREIGN PATENT DOCUMENTS

| | | | |
|---|---|---|---|
| 33385 | 2/1985 | Japan | 148/11.5 Q |
| 313878 | 11/1971 | U.S.S.R. | 148/34 |
| 578355 | 10/1977 | U.S.S.R. | 148/12 B |

Primary Examiner—John J. Zimmerman
Attorney, Agent, or Firm—Wenderoth, Lind & Ponack

[57] ABSTRACT

Pliable high-strength conductors for use in electronic instruments involving frequent movements, such as robots. They comprise a core layer of austenitic stainless steel and a covering layer of copper, or its alloy. Higher resistance to flexing fatigue is ensured by the addition of stainless steel as a core. An austenitic stainless steel wire having a specific diameter is employed and the percentage of sectional area of the covering layer to the total sectional area is specified.

2 Claims, 2 Drawing Sheets

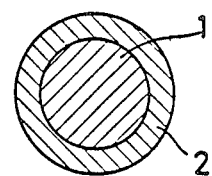
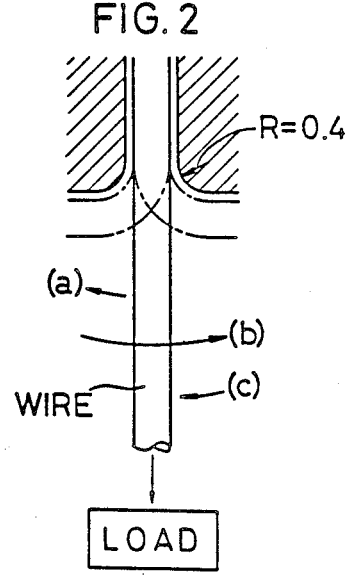

HIGH-STRENGTH CONDUCTORS AND PROCESS FOR MANUFACTURING SAME

This is a continuation-in-part application of copending application Ser. No. 917,499, filed Oct. 10, 1986 now abandoned.

present invention relates to high-strength conductors having improved resistance to flexing force, twisting force, tensile force, etc. and a process for manufacturing the same in an efficient manner.

Conductors used to electrically connect movable bodies together or between a movable body and a fixed body are usually subjected repeatedly to bending, flexing, twisting and tensile stresses. Therefore, for such a purpose, single or twisted ones of relatively flexible wires such as thin wires of copper, copper alloy or copper-plated iron are usually used.

Such conventional conductors do not have so good a resistance to flexing fatigue because the copper or iron as a base material does not have a sufficient strength. Wire breakage can occur at an early stage due to severe fatigue if such conductors are used in electrical circuits for connection between two movable points in equipment involving frequent movements such as robots, medical appliances, precision electronic instruments, and office automation devices, the demand for which is increasing.

An object of the present invention is to provide pliable high-strength conductors which have sufficient fatigue resistance properties to withstand repeated flexings and elongation deformations, and a process for manufacturing the same.

In accordance with the present invention, an austenitic stainless steel wire having a good balance between tensile strength and elongation is employed as a core material and it is covered with an electrically conductive material. As shown in FIG. 1, a covering layer 2 of copper or its alloy is formed on the outer periphery of an austenitic stainless steel wire 1 having a diameter of not less than 0.011 mm and not more than 0.7 mm, so that the percentage of sectional area of the covering layer to the total sectional area will be not less than 5% and not more than 70%. The tensile strength of the conductor multiplied by its elongation should be not less than 800.

In accordance with the present invention, there is also provided a method for manufacturing high-strength conductors comprising the steps of forming a covering layer of copper or its alloy on the outer periphery of an austenitic stainless steel wire so that the percentage of the sectional area of said covering layer to the total sectional area of the conductor will be not less than 5% and not more than 70%, drawing the covered stainless steel wire so that the diameter of said stainless steel wire will be not less than 0.011 mm and not more than 0.7 mm, and annealing said covered stainless steel wire for solution heat treatment, whereby obtaining a conductor having its tensile strength multiplied by its elongation of not less than 800.

Copper or its alloy having a good electric conductivity is used as a covering material because in the intended use a high-frequency current is used which tends to flow through the surface of a conductor. Further, copper or its alloy is used for the outer layer to provide flexibility which is one of the important properties for the intended applications, because copper and its alloy are softer and more difficult to work-harden than austenitic stainless steels.

The use of austenitic stainless steel for the core material is due to the fact that ferritic, martensitic and precipitation hardening stainless steels, and iron and steel show poor balance between tensile strength and elongation and low flexing value. The use of stainless steel as the core material is apparently improper because of its lower mechanical properties than steel, but it is one of the important features of the present invention.

High-strength conductors according to the present invention comprise an austenitic stainless steel wire having a specific diameter covered with copper or its alloy with a specific percentage in sectional area of the covering layer to the entire sectional area. They have a considerably increased strength and yet meet the requirement for electrical conductivity. The increase in strength is owing to the properties of austenitic stainless steel wire, of course.

Copper alloys intrinsically have a low elongation. Further, cold treatment for ensuring high strength impairs their elongation. In contrast, stainless steel assures high elongation because it can be used in an annealed state. Further, the addition of an austenitic stainless steel wire drastically increases resistance to flexing fatigue. Another advantage is that the electrical conductivity can be controlled by selecting the percentage of sectional area of the covering layer to the total sectional area.

With the method according to the present invention, the wire is drawn after the formation of the covering layer. This makes it possible to increase the covering efficiency and to apply the cladding process to very thin wires.

Other objects and features of the present invention will become apparent from the following description taken with reference to the accompanying drawings, in which:

FIG. 1 is a sectional view of the high-strength conductor embodying the present invention;

FIG. 2 is a view showing how the flexing value is measured, and

Figure 3:
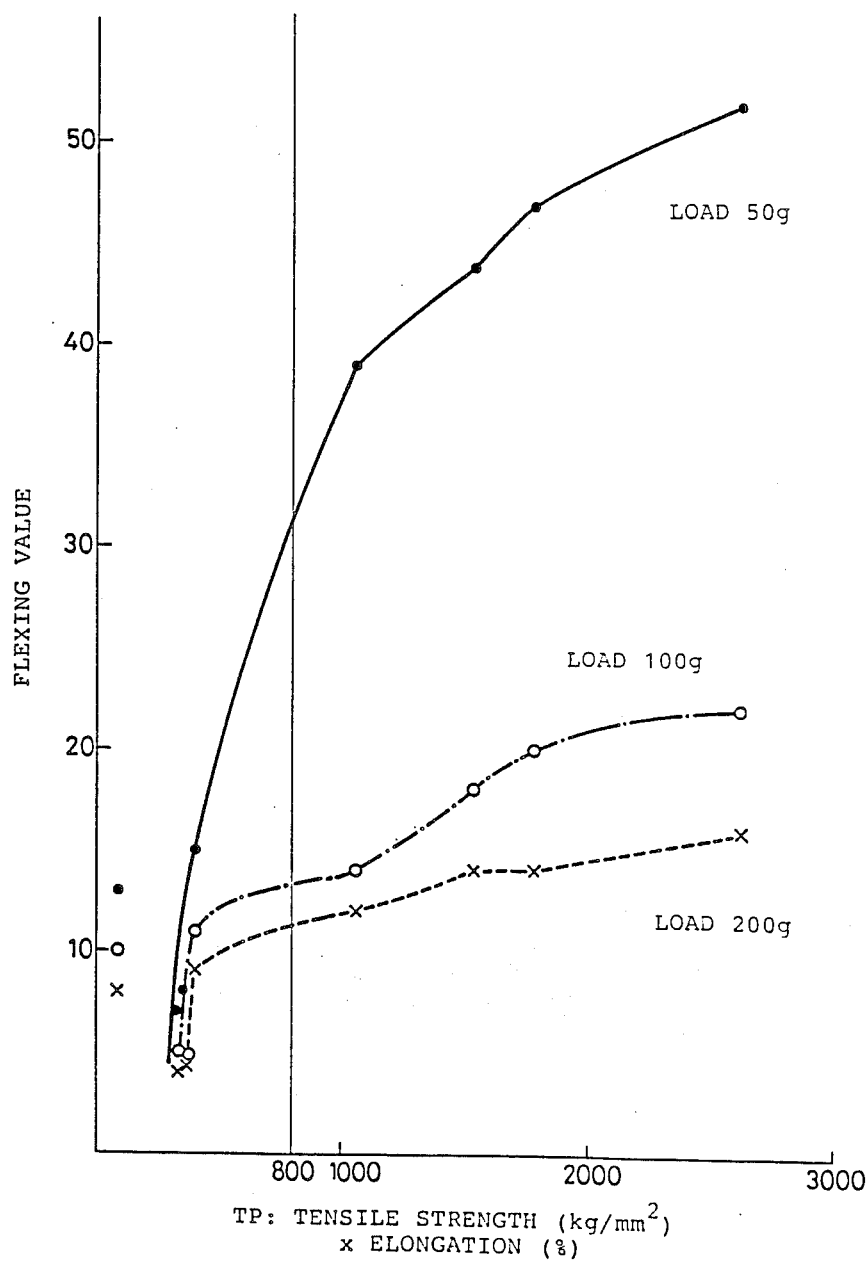
FIG. 3 is a graph showing the relationship between flexing value and tensile strength multiplied by elongation.

In the process according to the present invention, the material for the covering layer is limited to copper and its alloys. This is because the solution heat treatment for stainless steel is performed at about 1,000° C. which is above the melting point for aluminum and its alloys. Thus, it is impossible to cover the stainless steel wire with aluminum or its alloy before solution heat treatment.

In the conductor according to the present invention, the diameter of the stainless steel wire as a core is limited to not less than 0.011 mm and not more than 0.7 mm. This is because a wire having a diameter of less than 0.011 mm would have a breaking strength of less than 10 g which is too low for practical use, and a wire having a diameter of more than 0.7 mm would have a breaking strength of more than 20 kg and be too stiff to handle for use with electronic precision instruments which require flexibility for conductors.

The percentage of sectional area of the covering layer should be not less than 5% and not more than 70%. If less than 5%, the wire would not have an electrical conductivity required for electronic wires. If more than 70%, the effect of reinforcement by the stainless steel wire would not be sufficient.

The covering layer 2 may be formed by any ordinary method, e.g. by galvanizing or cladding. It may be formed before or after drawing the wire to a required diameter.

Among the mechanical properties required for the conductor of the present invention, the resistance to flexing or flexural fatigue is the most important. The resistance is usually tested by flexing a specimen repeatedly along arcuate surfaces to determine a flexing value which is a number of times by which the specimen resisted without breakage. But, because the flexing value depends on the load applied to the specimen and the diameter of the conductor, it does not provide a good criterion for evaluation of the resistance to flexing.

As a better criterion for evaluation of the resistance to flexing, the inventors introduced a TP value which is the tensile strength (kg per mm$^2$) multiplied by the elongation (%). The TP value does not depend on the load and the diameter of the conductor, but provides a good criterion for evaluation of the resistance to flexural fatigue which is the most important property required for use with robots and similar precision electronic instruments. The TP value is a combination of two mutually contradictory properties, but a good criterion for "pliableness" is obtained by multiplying them.

The high-strength conductors according to the present invention may be in the form of single wires, stranded wires, those with insulation covering, mesh conductors, and so on.

The conductors according to the present invention have been compared in characteristics with the conventional conductors to test their peformance. The test specimens used for measurement are as follows:

(A) Conductors of the Present Invention

1: 0.075 mm dia. stainless steel annealed wire (AISI 304) with copper plating 0.0125 mm thick.
2: A copper pipe clad on 3.0 mm dia. stainless steel (AISI 304) wire to a diameter to 4.1 mm. Wire drawings and annealings repeated to a wire diameter of 0.1 mm. Subjected to final annealing.
3: Other conditions are the same as in (2) except that the wire diameter after wire drawing was 0.26 mm.
4: Other conditions are the same as in (2) except that the wire diameter after wire drawing was 0.5 mm.
5: Other conditions are the same as in (2) except that the wire diameter after cladding was 5.0 mm.
6: After copper was plated to a thickness of 0.1 mm on a 3.0 mm dia. stainless steel (AISI 304) wire, wire drawings and annealings were repeated to a wire diameter of 0.1 mm. Subjected to a final annealing.
7: 7-strand stranded wire using the sample (2) as strands.

(B) Conventional Conductors

8: Pure copper annealed wire having a diameter of 0.1 mm
9: 0.26 mm dia. pure copper annealed wire
10: 0.5 mm dia. pure copper annealed wire
11: 0.1 mm dia. copper alloy (Cu-0.65Cr-0.13Ag) annealed wire
12: 0.26 mm dia. copper alloy (Cu-0.65Cr-0.13Ag) annealed wire
13: 0.1 mm dia. copper clad annealed steel wire (thickness of copper: 0.01 mm)
14: Same as sample No. 13, but not annealed.
15: 0.1 mm dia. stainless steel (AISI 304) wire subjected to solution heat treatment
16: 7-strand stranded wire using the sample (8) as strands.

(C) Comparative Examples

17: 7: Same as sample No. 2 except that AISI 420 was used instead of AISI 304
18: Same as sample No. 2 except that AISI 631 (precipitation hardening type stainless steel) was used instead of AISI 304 and that the conductor was subjected to ageing at 475° C. for one hour instead of final solution treatment For all the test specimens, the electrical conductivity, tensile strength, elongation, and flexing value were measured. The flexing value is the number of times by which the wire was bent along an arcuate surface having a radius of 0.4 mm in different directions in the order of (a), (b) and (c) under a load of 50, 100 or 200 grams without breakage as shown in FIG. 2. The tensile strength was multiplied by the elongation to obtain a TP value.

The results of measurements are shown in the Table.

As seen from the Table, the conductor according to the present invention has an electrical conductivity which depends on the percentage of sectional area of the covering layer (copper in the test specimens) and is smaller in comparison with the conventional conductors of copper or its alloy. However, its electrical conductivity is sufficient for use in most of electronic equipment since the current is not so large. Conversely, if the conductor of the present invention is used as a conductor for high-frequency current, it will exhibit a better electrical conductivity than the average electrical conductivity of section of the conductor, because the outer layer is of copper. Another merit is that the electrical conductivity can be controlled by adjusting the percentage of sectional area of the covering layer to the entire conductor.

The conductor according to the present invention has a tensile strength which is about triple that of conventional wire of copper or its alloy (equivalent to that of Sample No. 14) because it has an austenitic stainless steel wire as a core. Also, it has a much better elongation than wires of copper or its alloy or copper-clad annealed steel wire.

The flexing value is of most importance for wires used in robots or the like. The conductor of the present invention exhibits much better flexing properties than conventional conductors.

The Comparative Example (18) shows a fairly good TP value of 744, but not so good flexing values. This means that the requirements for the intended application are not met if stainless steel of other type than austenitic stainless steel is used as a core material.

A graph of FIG. 3 shows the relationship between the TP value (tensile strength X elongation) and the flexing value for copper-clad conductors using a core of austenitic stainless steel and having a diameter of 0.1 mm. This graph shows that when the TP value is over 800, the conductors show good flexing values.

TABLE

| | Wire diameter | | | | | | | | | | | | | | | | | |
|---|---|---|---|---|---|---|---|---|---|---|---|---|---|---|---|---|---|---|
| | 0.1 mm | | | | | | | | | | | 0.26 mm | | | 0.5 mm | | Stranded wire | |
| | A | | | | B | | | | | C | | A | B | | A | B | A | B |
| Sample number | 1 | 2 | 5 | 6 | 8 | 11 | 13 | 14 | 15 | 17 | 18 | 3 | 9 | 12 | 4 | 10 | 7 | 16 |
| Sectional area of copper/total sectional area (%) | 44 | 46 | 12 | 64 | — | — | 36 | 36 | — | 46 | 46 | 46 | — | — | 46 | — | 46 | — |
| Electrical conductivity (IACS) | 45 | 47 | 12 | 65 | 97 | 83 | 40 | 40 | 3 | 46 | 48 | 48 | 96 | 91 | 47 | 97 | 47 | 97 |
| Tensile strength (kg/mm$^2$) | 53 | 56 | 75 | 44 | 22 | 35 | 40 | 78 | 78 | 120 | 62 | 54 | 24 | 39 | 59 | 23 | 53 | 20 |
| Elongation (%) | 29 | 32 | 35 | 24 | 15 | 10 | 10 | 1 | 51 | 1 | 12 | 25 | 19 | 9 | 30 | 18 | 41 | 21 |
| Flexing value (times) | | | | | | | | | | | | | | | | | | |
| Load 50 g | 44 | 47 | 52 | 39 | 7 | 8 | 15 | 13 | 54 | * | 17 | 227 | 28 | 33 | over 500 | 92 | over 500 | 150 |
| Load 100 g | 18 | 20 | 22 | 14 | 5 | 5 | 11 | 10 | 23 | 6 | 12 | 100 | 14 | 16 | 292 | 39 | 450 | 50 |
| Load 200 g | 14 | 14 | 16 | 12 | 4 | 5 | 9 | 8 | 17 | 5 | 9 | 50 | 7 | 10 | 115 | 17 | 82 | 33 |
| TP value (Tensile strength × Elongation) | 1540 | 1790 | 2630 | 1060 | 330 | 350 | 400 | 78 | 3980 | 120 | 744 | 1350 | 460 | 350 | 1770 | 414 | 2170 | 420 |

What is claimed is:

1. A high-strength conductor for use with robots and precision electronic instruments, the conductor comprising a core of an austenitic stainless steel wire having a diameter of not less than 0.011 mm and not more than 0.7 mm, and a covering layer of copper or copper alloy, the percentage of the sectional area of said covering layer to the total sectional area of the conductor being not less than 5% and not more than 70%, the tensile strength of the conductor multiplied by the elongation of the conductor being not less than 800.

2. A method for manufacturing high-strength conductors, comprising the steps of forming a covering layer of copper or its alloy on the outer periphery of an austenitic stainless steel wire so that the percentage of the sectional area of said covering layer to the total sectional area of the conductor will be not less than 5% and not more than 70%, drawing the covered stainless steel wire so that the diameter of said stainless steel wire will be not less than 0.011 mm and not more than 0.7 mm, and annealing said covered stainless steel wire for solution heat treatment, whereby obtaining a conductor having its tensile strength multiplied by its elongation of not less than 800.

* * * * *